United States Patent
Rocchi et al.

(10) Patent No.: US 9,995,583 B2
(45) Date of Patent: Jun. 12, 2018

(54) SYSTEMS AND METHODS FOR MEMS GYROSCOPE SHOCK ROBUSTNESS

(71) Applicant: Hanking Electronics, Ltd., Canton, OH (US)

(72) Inventors: Alessandro Rocchi, Rosignano Solvay (IT); Lorenzo Bertini, Pisa (IT); Eleonora Marchetti, Montecatini-Terme (IT)

(73) Assignee: Hanking Electronics, Ltd., Solon, OH (US)

( * ) Notice: Subject to any disclaimer, the term of this patent is extended or adjusted under 35 U.S.C. 154(b) by 256 days.

(21) Appl. No.: 14/477,017

(22) Filed: Sep. 4, 2014

(65) Prior Publication Data
US 2015/0330783 A1 Nov. 19, 2015

Related U.S. Application Data

(60) Provisional application No. 61/993,626, filed on May 15, 2014.

(51) Int. Cl.
*G01C 19/5747* (2012.01)
*G01C 19/574* (2012.01)
*G01C 19/5769* (2012.01)

(52) U.S. Cl.
CPC ....... *G01C 19/5747* (2013.01); *G01C 19/574* (2013.01); *G01C 19/5769* (2013.01)

(58) Field of Classification Search
CPC .......................... G01C 19/5769; G01C 19/574

USPC ....................................................... 73/504.12
See application file for complete search history.

(56) References Cited

U.S. PATENT DOCUMENTS

| | | | | |
|---|---|---|---|---|
| 2010/0116050 A1* | 5/2010 | Wolfram | ............... | G01C 19/574 73/504.12 |
| 2012/0013355 A1* | 1/2012 | Narita | ................... | G01C 19/574 324/679 |
| 2013/0098152 A1* | 4/2013 | Jeong | .................... | G01C 19/574 73/504.12 |
| 2013/0285172 A1* | 10/2013 | Jeong | ................... | G01C 19/574 257/415 |

* cited by examiner

*Primary Examiner* — David M Gray
*Assistant Examiner* — Andrew V Do
(74) *Attorney, Agent, or Firm* — Hartman Global IP Law; Gary M. Hartman; Domenica N. S. Hartman

(57) ABSTRACT

Various embodiments of the invention allow for increased shock robustness in gyroscopes. In certain embodiments, immunity against undesired forces that corrupt signal output is provided by a chessboard-pattern architecture of proof masses that provides a second layer of differential signals not present in existing designs. Masses are aligned parallel to each other in a two-by-two configuration with two orthogonal symmetry axes. The masses are driven to oscillate in such a way that each mass moves anti-parallel to an adjacent proof mass. In some embodiments of the invention, a mechanical joint system interconnects proof masses to suppress displacements due to mechanical disturbances, while permitting displacements due to Coriolis forces to prevented erroneous sensor signals.

16 Claims, 19 Drawing Sheets

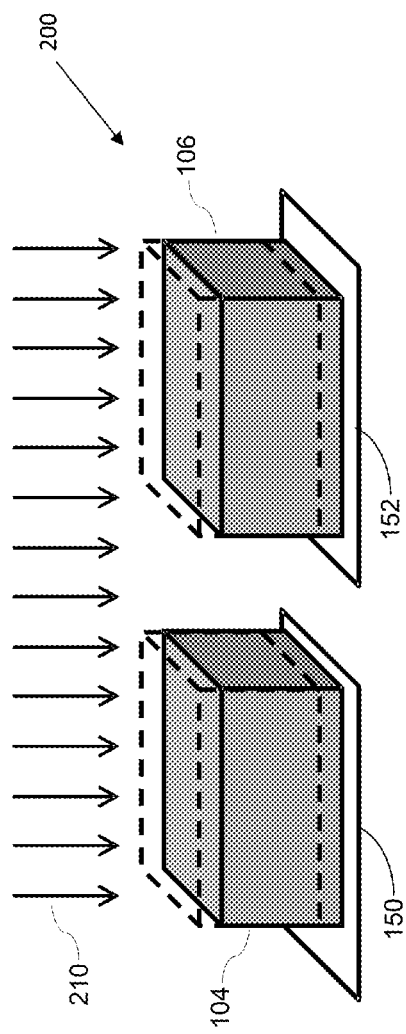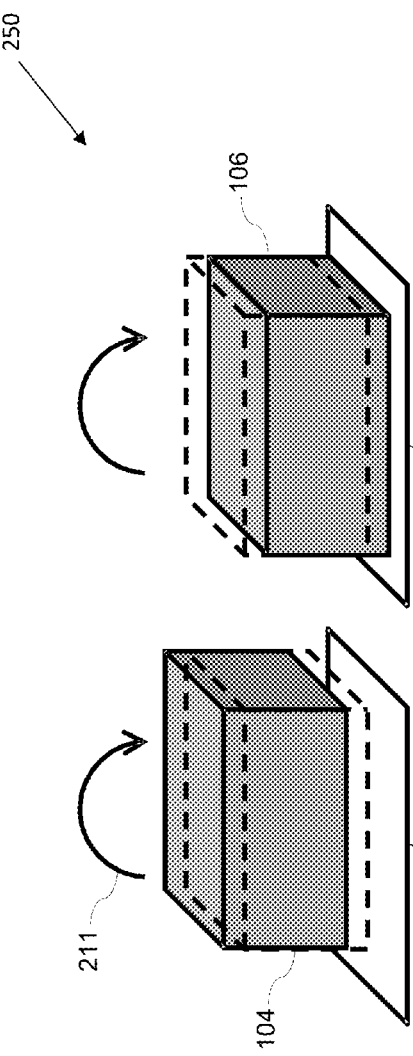
FIGURE 2A (PRIOR ART)
FIGURE 2B (PRIOR ART)

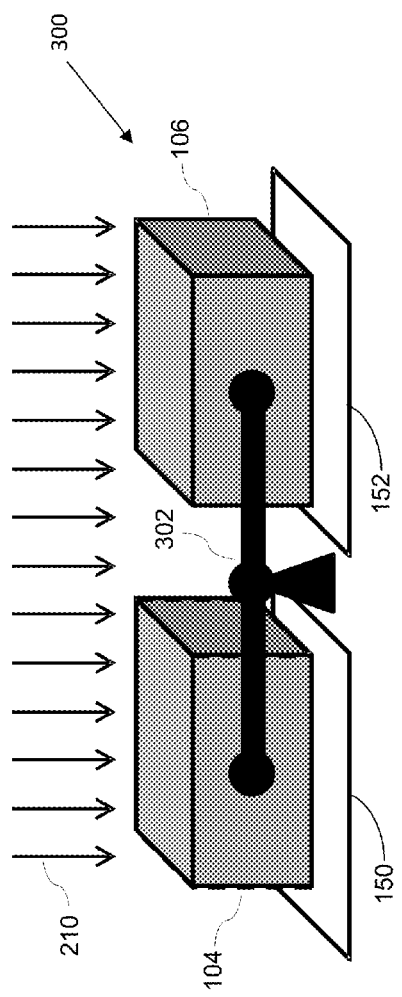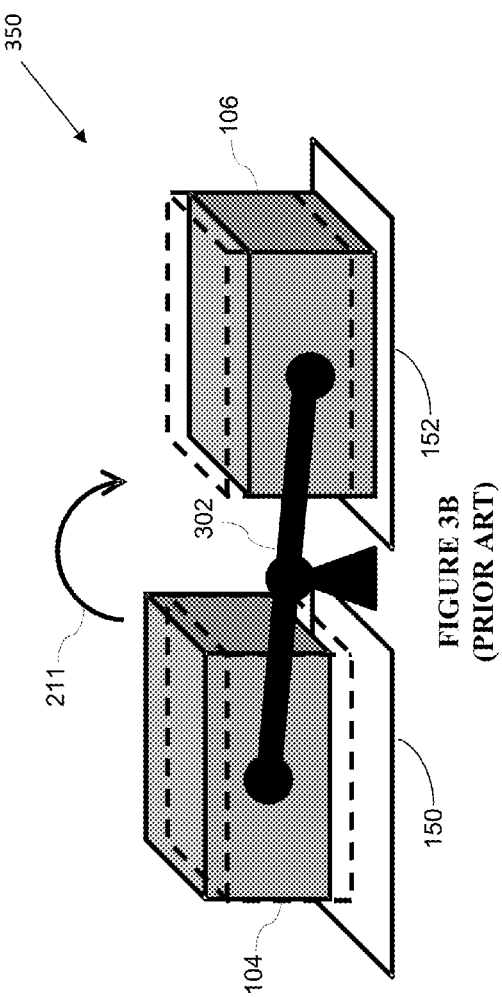

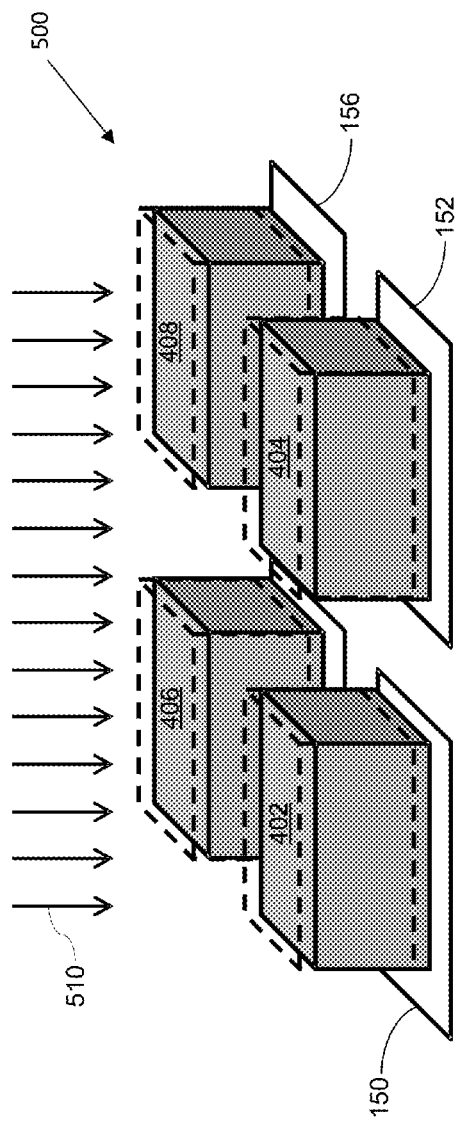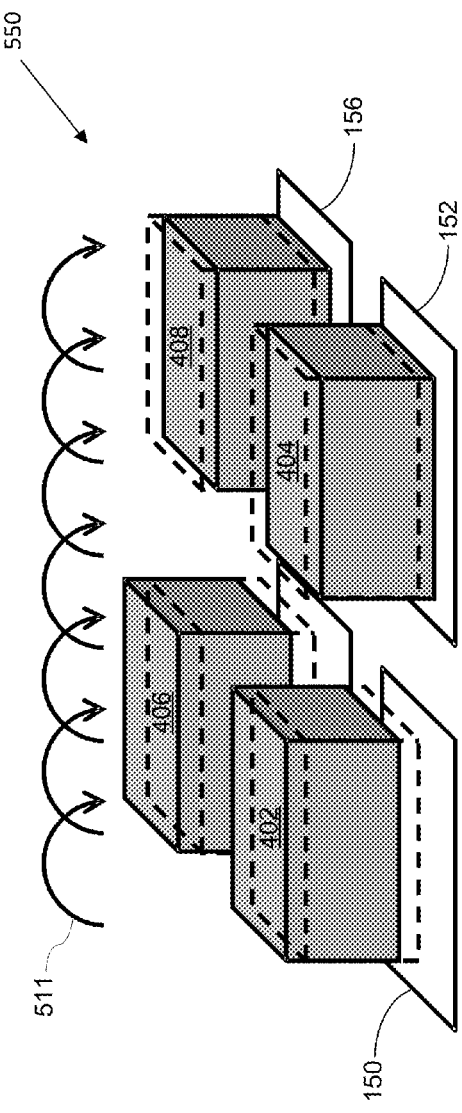

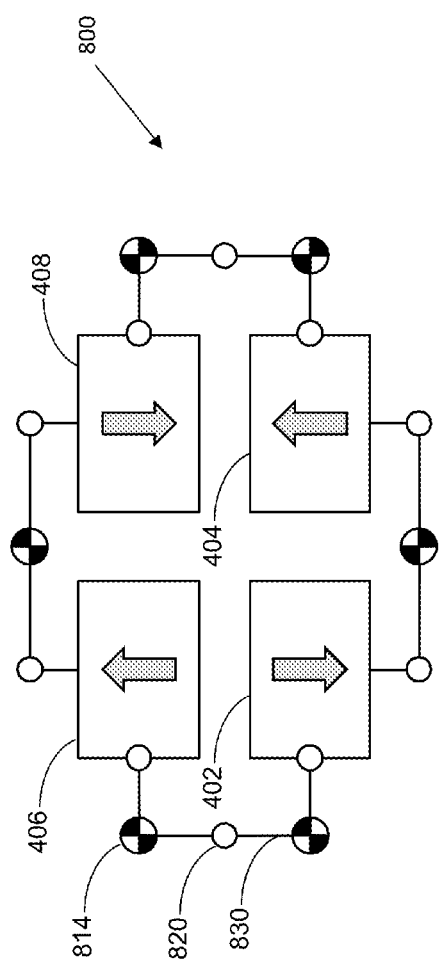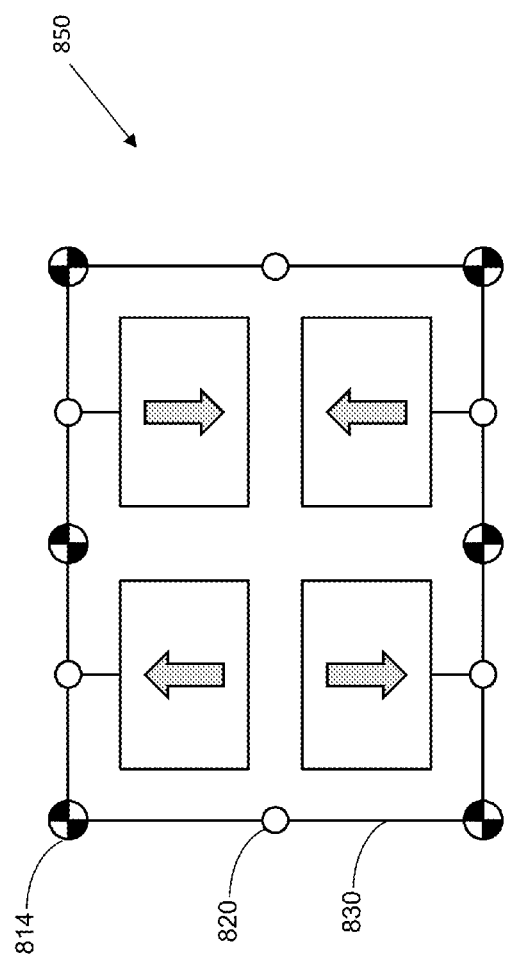
FIGURE 8A
FIGURE 8B

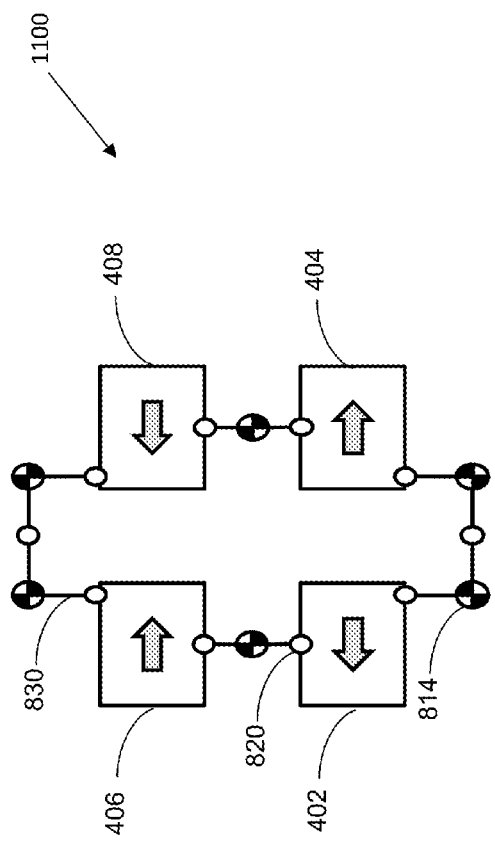
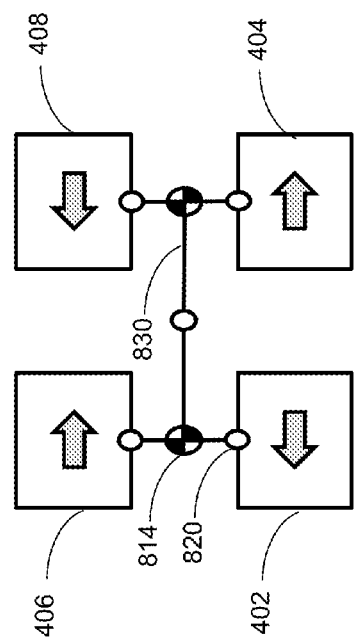
FIGURE 11A
FIGURE 11B

SYSTEMS AND METHODS FOR MEMS GYROSCOPE SHOCK ROBUSTNESS

CROSS REFERENCE TO RELATED PATENT APPLICATIONS

The present application claims priority to U.S. Provisional Application Ser. No. 61/993,626 titled "Systems and Methods for MEMS Gyroscope Shock Robustness," filed May 15, 2014. by Alessandro Rocchi, Lorenzo Bertini, and Eleonora Marchetti, which application is hereby incorporated herein by reference in its entirety and from which application priority is hereby claimed.

BACKGROUND

A. Technical Field

The present invention relates to rate sensors. More particularly, the invention relates to systems, devices, and methods of providing shock robustness for MEMS rate of rotation sensors, such as gyroscopes.

B. Background of the Invention

MEMS gyroscopes are sensors that when continuously excited by driving electronics to perform a primary oscillation can sense a rotation rate about one or more axes by detecting deflections of mechanical structures that result from forces caused by the Coriolis effect.

A common problem of MEMS gyroscopes is that it may be exposed to different types of external mechanical disturbances, such as shock, vibrations, and other undesirable environmental mechanical noise that can negatively impact the sensor's excitation and rate measurement. In general, a shock is a combination of forces and momentum with arbitrary orientation within a three-dimensional system of coordinates. In other words, mechanical disturbances may comprise six components—three translational and three rotational components.

External mechanical disturbances have numerous side effects, including the creation of spurious output signals that falsify the sensor's reading, e.g., when a shock event induces a deflection similar to a to-be-detected deflection created by a Coriolis force. The two superimposing signals may corrupt the rate measurement. Second, when shock events are great enough to cause the proof masses within the gyroscope to contact stopper structures that are attached to the substrate and designed to limit the displaceability of the masses, they lose some of their kinetic energy, and the sensor's primary oscillation will have to be restarted during which time the entire device remains inoperable.

Shock robustness of gyroscopes, especially in automotive and similar applications, is a highly desirable feature that would allow gyroscopes to remain functional and deliver accurate electric output signals even in scenarios when the device is subject to certain levels of mechanical disturbance.

What is needed are devices, systems, and methods for system designers to overcome the above-described limitations.

SUMMARY OF THE INVENTION

The disclosed systems and methods increase shock robustness in both single-axis and multi-axis rate sensors such as gyroscopes. In particular, certain embodiments of the invention provide sensor immunity against interference from translational and rotational shock conditions acting, such as shock, vibrations, and other undesirable environmental mechanical noise that are likely to generate spurious electrical differential output signals that, in turn, would be erroneously interpreted as a rotational speed, thus falsifying the sensor's reading.

In various embodiments of the invention, shock robustness is facilitated by a chessboard-pattern architecture of proof masses that provides a second layer of differential signals not present in existing designs. Masses are aligned parallel to each other in a two-by-two configuration with two orthogonal symmetry axes. The masses are driven to oscillate in such a way that each mass moves anti-parallel to an adjacent proof mass.

In some embodiments, electrodes located underneath movably suspended proof masses are arranged in a chessboard-pattern and connected as balanced differential pairs in order to electrically cancel the effect of mechanical disturbances such as linear and angular accelerations. This immunizes the sensor against undesired forces that could otherwise superimpose with desired Coriolis forces and impact the accuracy of the output signal.

In some embodiments, electrodes associated with the masses are configured in a two-by-two chessboard-pattern, and one mass from each pair of masses is electrically coupled to another pair so as to form a balanced differential electrical pair. In addition, a mechanical joint system coupled to the proof masses inhibits displacements of masses provoked by undesired mechanical disturbances, such as linear accelerations and angular accelerations, while permitting displacements due to the desired Coriolis forces. In other words, mechanical disturbances are prevented from causing unwanted movements that may lead to erroneous output signals or sensor malfunction.

Certain features and advantages of the present invention have been generally described here; however, additional features, advantages, and embodiments presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIG. 2A shows the respective effect of translational shock for a common implementation of a MEMS gyroscope.

FIG. 2B shows the respective effect of rotational shock for a common implementation of a MEMS gyroscope.

FIG. 3A shows the effect of translational shock for an implementation of a MEMS gyroscope having a mechanical joint.

FIG. 3B shows the effect of rotational shock for an implementation of a MEMS gyroscope having a mechanical joint.

FIG. 5A illustrates the effect of translational shock for the chessboard configuration in FIG. 4.

FIG. 5B illustrates the effect of rotational shock for the chessboard configuration in FIG. 4.

FIG. 8A and FIG. 8B illustrate examples of primary joint systems according to various embodiments of the invention.

FIG. 11A and FIG. 11B illustrate examples of secondary joint systems in a yaw rate sensor according to various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document the terms "primary" motion, mode, and axis refers to the driving motion of proof masses and the terms "secondary" motion, mode, and axis, generally, refers to sensing operations. Detailed descriptions of components, such as driving electronics, joints, and anchoring to frames, for example for driving the joints, are omitted for brevity and clarity. Further, the term "shock" includes any type of translational and angular acceleration, vibration, and mechanical noise.

Figures 1A, 1B:
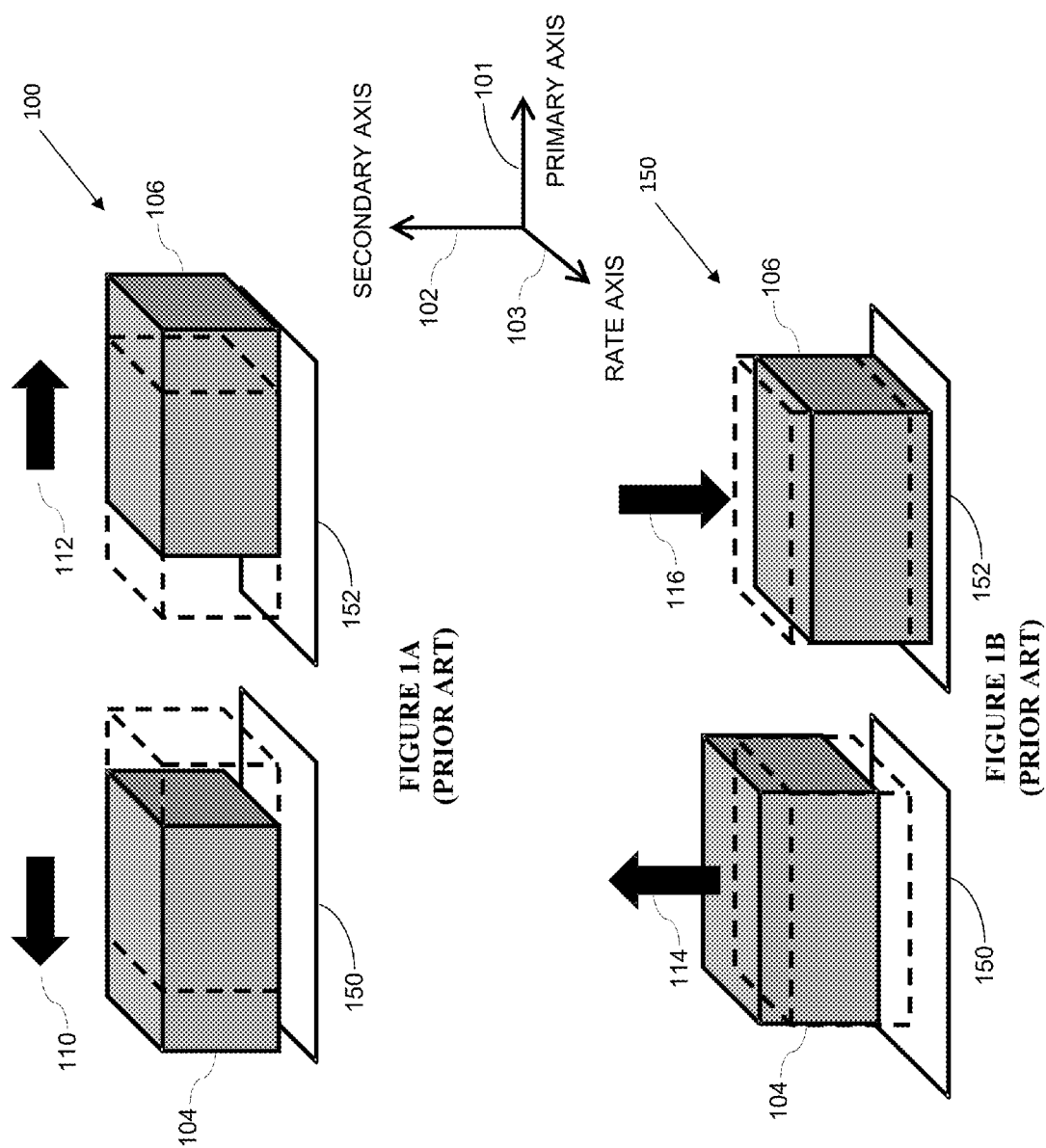
FIG. 1A shows primary motion for a typical MEMS gyroscope.
FIG. 1B shows secondary motion for a typical MEMS gyroscope.

FIG. 1A shows primary motion for a typical MEMS gyroscope, while FIG. 1B shows secondary motion for a typical MEMS gyroscope. Masses 104, 106 in FIG. 1A are excited from their resting positions (indicated by dashed lines) by driving forces 110, 112 to perform an oscillatory movement along the primary axis 101 parallel to electrodes 150, 152 until masses 104, 106 reach their maximum deflection. Electrodes 150, 152 are connected to an electric circuit (not shown) to measure the distance between masses 104, 106 and electrodes 150, 152 via determining capacitance, as those of ordinary skill in the art will appreciate.

However, if system 100 is exposed to a rotation about the sensitive axis (here rate axis 103), the Coriolis effect creates oscillating forces 114, 116 along secondary axis 102 that will be detected by electrodes 150, 152 as a differential signal. Oscillating forces 114, 116 occur in addition to the driving motion (not shown in FIG. 1B). In detail, Coriolis force 114 causes mass 104 to travel a distance away from electrode 150, thereby, lowering the capacitance. At the same time, Coriolis force 116 causes mass 106 to move toward electrode 152, which decreases the distance to electrode 152 and increases the capacitance accordingly. This change in position is detected as a variation in capacitance due to Coriolis forces and can be measured as a differential signal on electrodes 150, 152 that is proportional to the angular rate to be determined.

FIG. 2A and FIG. 2B show the respective effects of translational and rotational shock for a common implementation of a MEMS gyroscope. Same numerals as in FIG. 1 denote similar elements. As can be deduced from FIG. 2A, an external linear acceleration of masses 104, 106 induced by force 210 in a translational direction results in a common mode signal rather than a differential signal, as both masses 104, 106 are affected by the same variation in capacitance, thus, creating a zero differential electric output signal. Therefore, by using two proof masses 104, 106 as compared to using a single mass, linear acceleration can be ignored or isolated and canceled from the output signal so as to eliminate the impact of this type of external shock.

In contrast, angular acceleration 211 around the rate axis, e.g., an unwanted spinning pulse of the MEMS gyroscope about the rate axis, is more problematic. Such a shock event acts to induce an unequal displacement of both masses 104, 106 along the secondary axis, i.e., in the same direction as the to-be-detected Coriolis force, which, by definition, is also normal to the axis of rotation. A shown in FIG. 2B, the unequal forces cause mass 106 to move closer to electrode 152 while causing mass 104 to move away from electrode 150. Since the resulting parasitic signals superimpose the sensing signal from which they cannot be easily distinguished, parasitic signal components cannot be canceled by appropriate electronic circuitry. As a result, the output signal will include an error component due to the effect of the shock and erroneously indicate an angular rate.

In general, errors that generate common mode signals are relatively easy to deal with, because unlike in single mass architectures in which an uncorrected superposition of undesired motion vectors due to perturbation always results in a falsification of the output signal, common mode signals due to a common mode movement of masses 104 and 106 can at least be partially canceled to reduce the effect of certain unwanted acceleration components. However, architecture 250 remains vulnerable to external perturbation due to certain shock events.

Some existing approaches utilize coupling joint system 302 between masses 104 and 106 (shown in FIG. 3A and FIG. 3B) in order to reduce deflections caused by translational force 210. However, the usefulness of such a design is limited to reducing only translational motion in system 302. These designs cannot reduce the effects of all types of shock. In particular, coupling joint system 302 cannot prevent motion caused by rotational acceleration 211 for the purpose of avoiding erroneous readings by electrodes 150, 152.

Therefore, it would be desirable to have systems and methods available that increase the shock robustness of both single and multi-axial sensors against all types of shock so as to ensure accurate sensor readings.

Figure 4A:
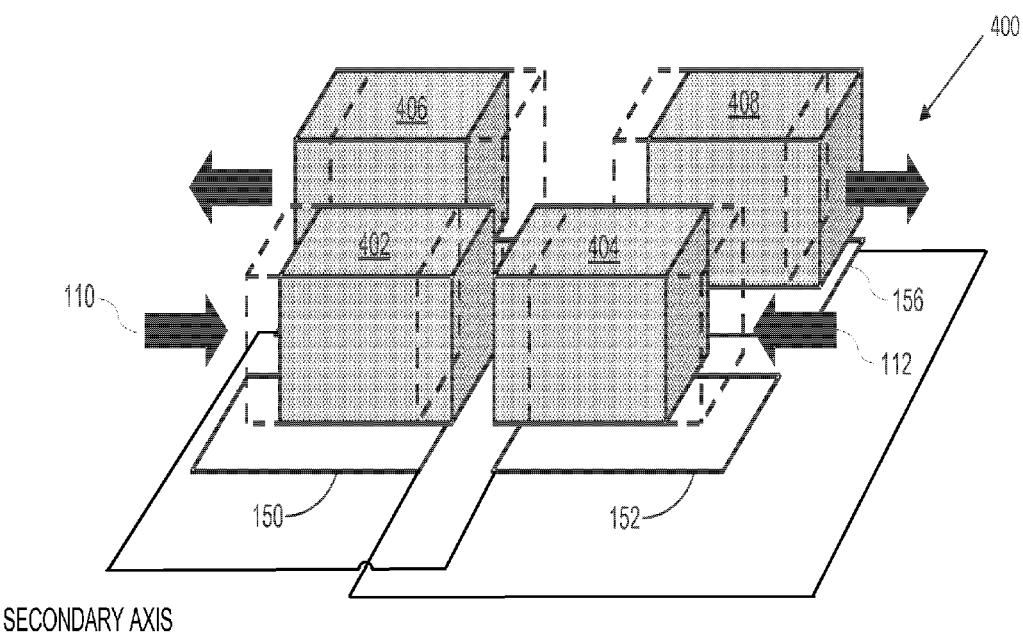
FIG. 4A is a general illustration of primary motion in a "chessboard" configuration of proof masses according to various embodiments of the invention.
Figure 4B:
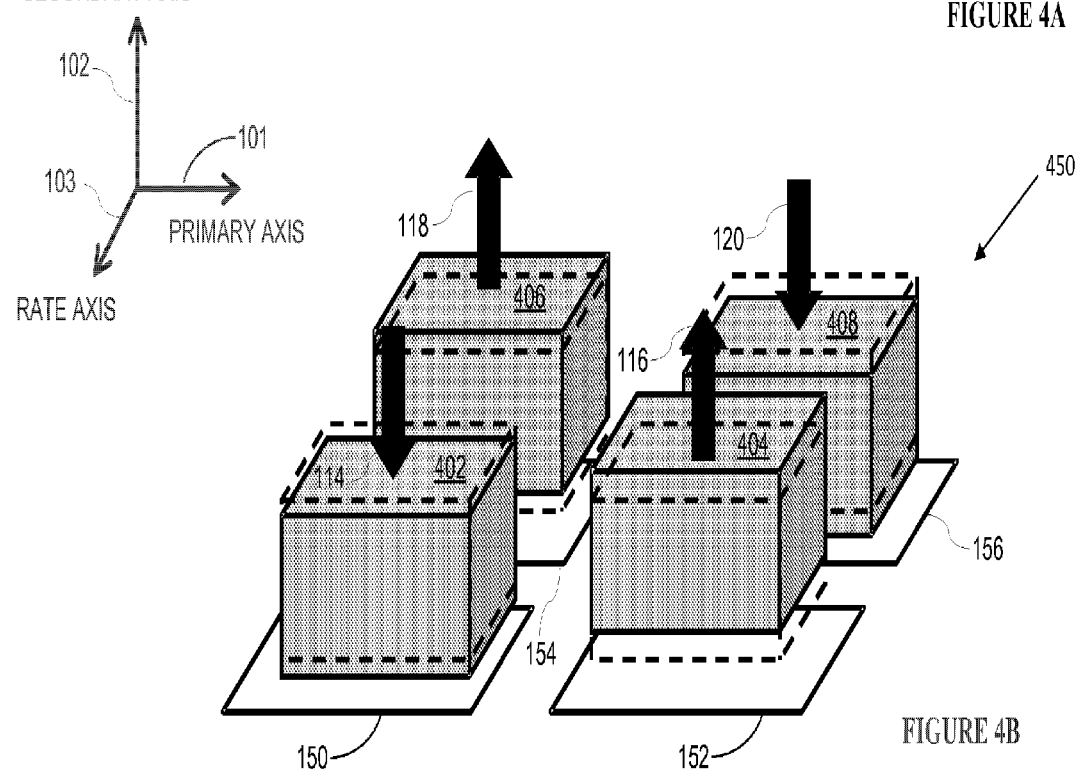
FIG. 4B is a general illustration of secondary motion in a chessboard configuration of proof masses according to various embodiments of the invention.

FIG. 4A and FIG. 4B generally illustrate primary and secondary motion in a chessboard configuration of movable proof masses in a sensing device according to various embodiments of the invention. For clarity, components such as springs, anchors, frames, and actuators are omitted. In FIG. 4A and FIG. 4B, four essentially equal masses 402-408 are movably suspended within a base frame and disposed above their respective electrodes 150-156. Masses 402-408 are aligned parallel to each other, as two balanced differential pairs, in a two-by-two configuration that has two orthogonal symmetry axes. The primary motion, secondary motion, and associated electrode connections are arranged in a "chessboard" configuration that adds another layer of differential signals not present in existing designs.

In operation, masses 402-408 in FIG. 4A are constantly driven to perform an oscillatory motion along primary axis 101 that is parallel to electrodes 150-156. Movable proof mass 402 is driven in the same direction as mass 408, whereas masses 404 and 406 are driven in the opposite direction along the same primary axis. Electrodes 150-156 are configured to detect movements of masses 402-408 along the secondary axis 102. FIG. 4B illustrates how masses 402-408 move along the secondary axis due to Coriolis forces that are generated by an angular rate around the rate axis 103, which is the rate to be measured by system 450. One skilled in the art will appreciate that masses 402-408 may comprise any suitable shape.

In both the primary and secondary oscillation, all four masses 402-408 move along parallel paths, and each mass 402-408 moves anti-phase with two adjacent masses and in-phase with diametrically opposite mass. For example, when Coriolis force 114, 120, the force to be measured, moves mass 402, 408 along the secondary axis toward electrodes 150 and 156, respectively, at the same time, Coriolis force 116, 118, which acts in the opposite direction with respect to the Coriolis force 114, 120, moves mass 404, 406 away from electrodes 152, 154. In this example, electrodes 150 and 156 are coupled with each other and the output signal is sent to an electric reading circuit (e.g., an ASIC), while electrodes 152 and 154 are coupled to produce a second output signal. From both output signals one electrical differential signal representative of the desired Coriolis force is obtained. One of ordinary skill in the art will appreciate that while only planar electrodes are shown in the figures, electrodes 150-156 may be shaped in any other manner known in the art, including as capacitive finger electrodes, known as comb electrodes.

FIGS. 5A and 5B illustrates the effect of undesired external translational and rotational acceleration on proof masses in the chessboard configuration in FIG. 4. For clarity, components similar to those shown in FIG. 4 are labeled in the same manner. For purposes of brevity, a description of their function is not repeated here. External translational force 510 caused by, for example a linear acceleration, moves all masses 402-408 parallel along the secondary axis. The resulting equal change in capacitance between masses 402-408 and electrodes 150-156 generates no unwanted electrical differential output signal. Instead a common mode signal is generated and only wanted angular rate is measured.

Similarly, in case of unwanted angular acceleration 511, for example, when masses 404 and 408 are accelerated to a greater extent than masses 402 and 406, the distance between mass 404, 408 and electrodes 152, 156 will decrease, while the distance between mass 402, 406 and electrodes 150, 154 will increase, such that the overall change in capacitance experienced by electrodes 152 and 154 and electrodes 150 and 156 remains essentially equal, again, rejecting unwanted differential signals that may lead to erroneous output signals.

The architecture of system 400, 450 reliably generates a common mode signal on electrodes 150-156 that electrically cancels the effect of mechanical disturbances so as to not impact the accuracy of the output signal, i.e., the reading of the gyroscope. As such, system 400, 450 is much more immune against mechanical shock due to both linear acceleration and momentum irrespective of orientation.

It is envisioned that one system per sensing axis may be arranged to create a multi-axis gyroscope. It is noted that the shown symmetry is applied only to the four masses 402-408. However, other structures of the sensor may be arranged in any suitable manner with respect to the two symmetry axes of the chessboard configuration.

Figure 6:
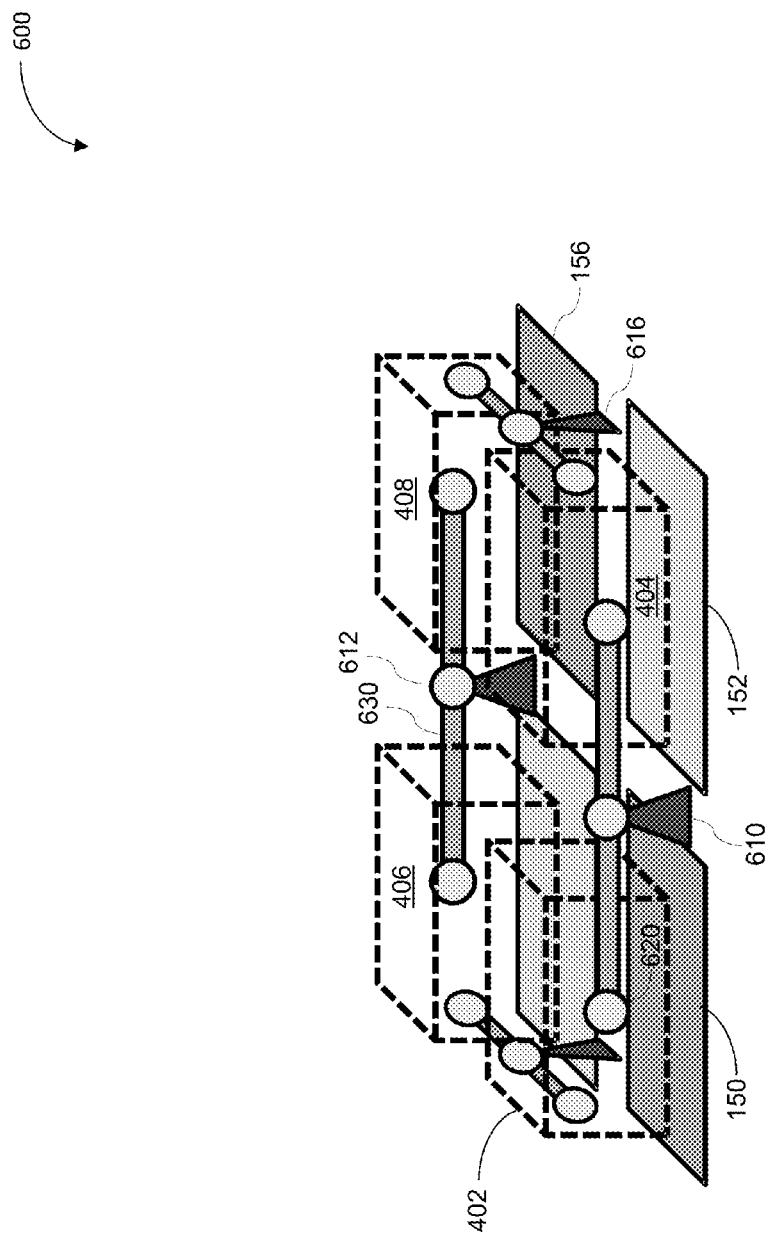
FIG. 6 is an exemplary application of a mechanical joint system to the chessboard configuration in FIG. 4 according to various embodiments of the invention.

FIG. 6 is an exemplary application of a mechanical joint system to the chessboard configuration in FIG. 4 to reduce deflections caused by environmental perturbations according to various embodiments of the invention. System 600 has two orthogonal symmetry axes, as can be easily seen. System 600 comprises essentially equal masses 402-408, which are suspended above electrodes 150-156, respectively, and coupled to each other with rotary joint 610-616. In a manner similar to FIG. 4A and FIG. 4B, masses 402-408 are movably arranged within a base frame and disposed above their respective electrodes 150-156 as two balanced differential pairs in a two-by-two configuration that has two orthogonal symmetry axes. Examples of primary and secondary operative motion for mass 402-408 are similar to this given with respect to FIG. 4A and FIG. 4B.

In one embodiment, each rotary joint 610-616 is formed by combining a rigid and a flexible body, such as a spring, and an anchor point that may be fixed to the base frame (not shown) that holds masses 402-408 in place. By employing rotary joints 610-616, mass 402 is forced to move in tandem with mass 408 and mass 404 is forced to move in tandem with mass 406. As a result, any common mode motion, such as the one discussed with respect to FIG. 5A or FIG. 5B, is mechanically suppressed while continuing to permit regular secondary motion. In detail, by preventing masses that are designed to move in the same direction (e.g., mass 402 and 408) to move at different rates by using rotary joints 610-616, forces caused by, e.g., angular acceleration around the rate axis and other unwanted disturbances are prevented from both vectorially adding to wanted Coriolis forces and, thus, corrupting the output signal. Furthermore, in addition to the electrical rejection discussed above with respect to FIG. 4A through FIG. 5B, this mechanical constraint prevents the masses from touching the stopper structures and, thereby, helps to prevent the need to restart the primary motion.

Figure 7:
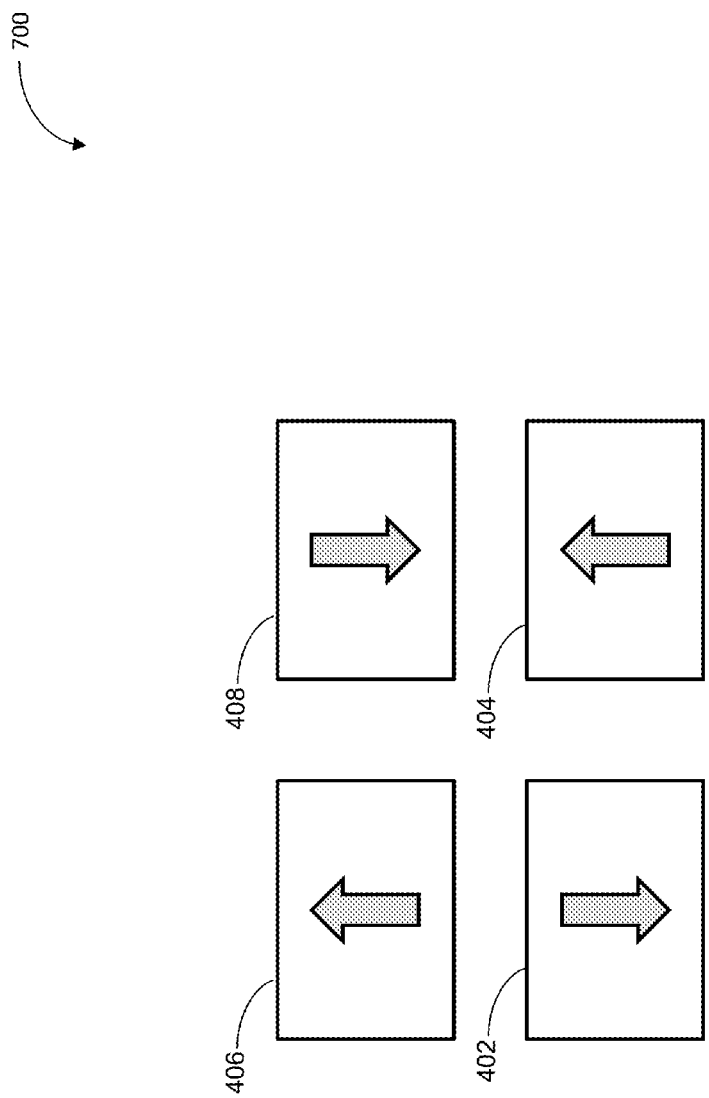
FIG. 7 schematically illustrates primary motion according to various embodiments of the invention.

In one embodiment, a similar set of rotary joints is used to effectively inhibit unwanted motions resulting from motion in the primary direction. The direction of primary motion is schematically captured in FIG. 7. In another embodiment, rotary joints are used to effectively inhibit unwanted motions in both the primary and secondary direction.

FIG. 8A and FIG. 8B illustrate examples of primary rotary joint systems according to various embodiments of the invention. In example system 800, 850, masses 402-408 are attached to fixed mechanical hinges 814 via flexible mechanical hinges 820. Each fixed mechanical hinge 814 is coupled to a flexible mechanical hinge 820 via rigid arm 830. It is noted that any other possible configuration of masses and rotatable joint system may be used in accordance with the goals of the present invention. It is also noted that although the previous description is primarily focused on improving the shock robustness of "pitch rate" sensors having an in-plane rate axis and an out-of-plane secondary motion, this is not intended as a limitation on the scope of the invention, as the principles of the present invention are equally applicable to, for example, "yaw rate" sensors that have an out-of-plane rate axis and an in-plane secondary motion.

Figure 9:
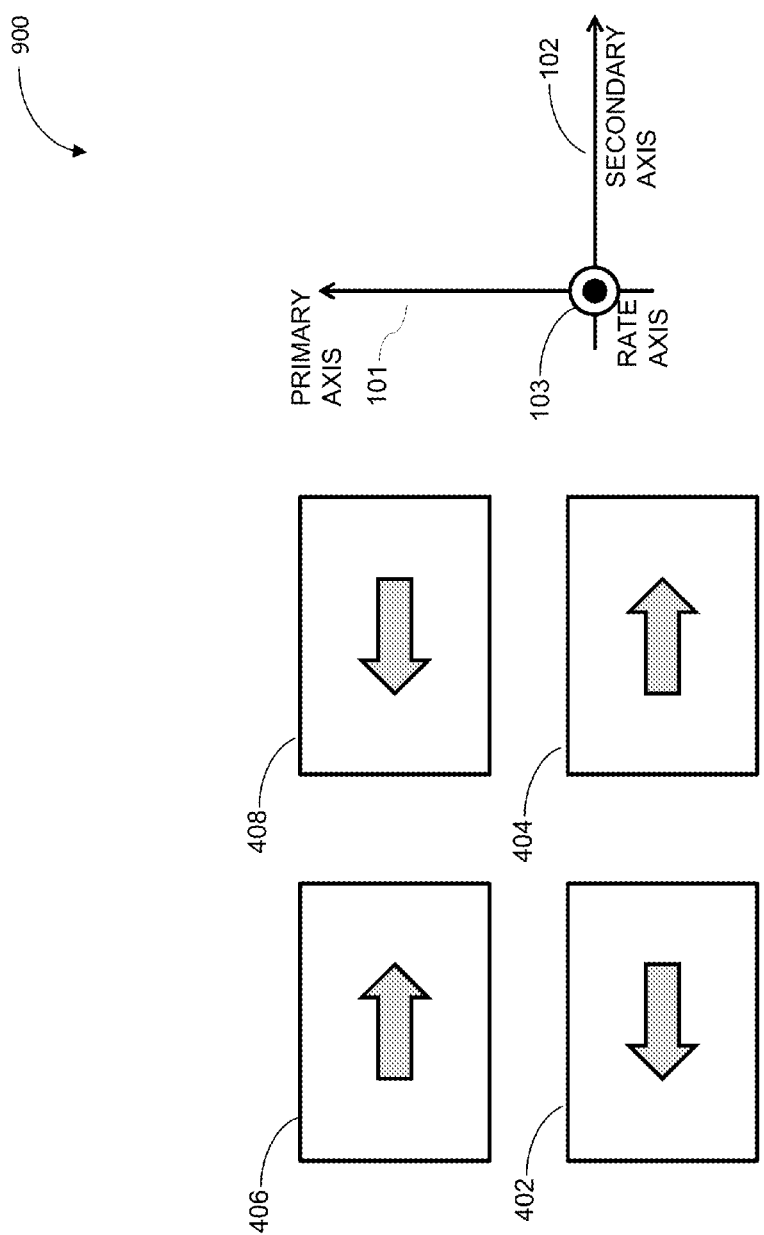
FIG. 9 illustrates secondary motion in a "yaw rate sensor" implementation according to various embodiments of the invention.

In one embodiment, in a yaw rate sensor implementation, the secondary motion is such that proof masses 402-408 move in the same direction along secondary axis 102 that is in-plane and orthogonal to primary axis 101 and rate axis 103, as shown in FIG. 9. In this example, the plane of motion is parallel to the plane of the substrate on which the MEMS gyroscope is placed. The gyroscope is sensitive to rotation about the axis that protrudes out of the plane of the drawing, i.e., forming a z-gyroscope.

Figure 10:
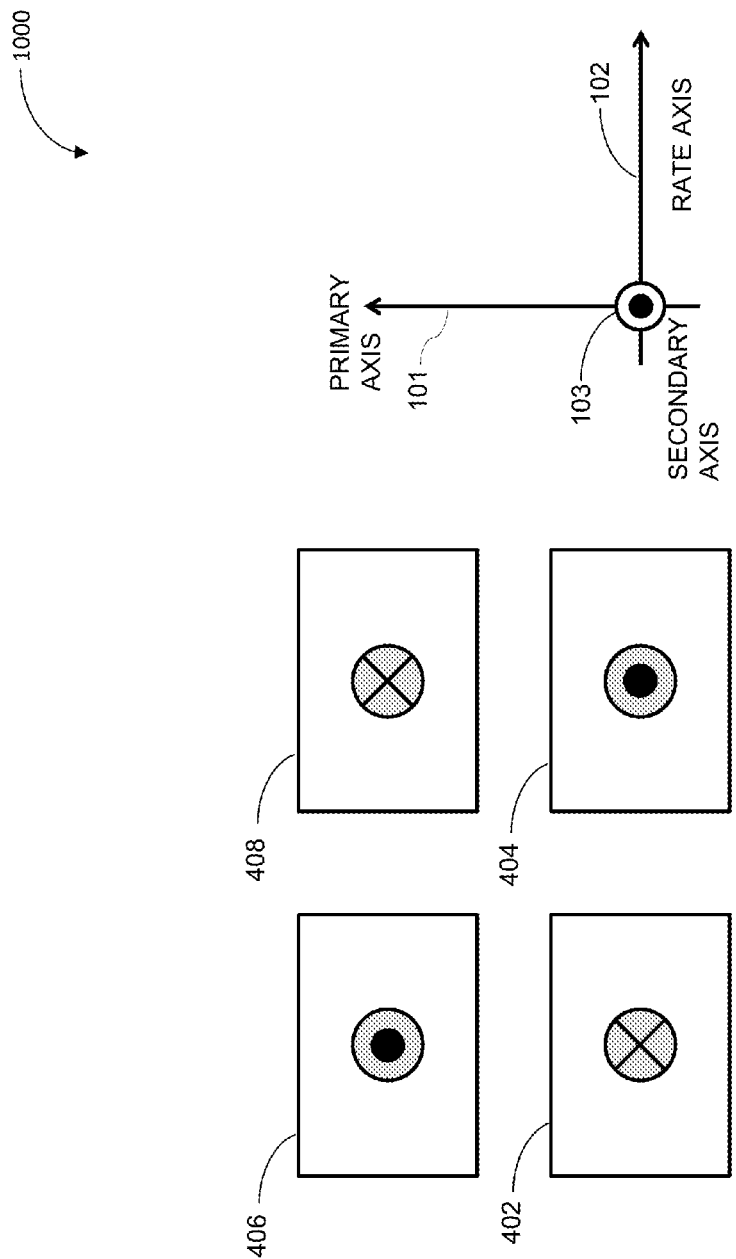
FIG. 10 illustrates secondary motion in a "pitch rate sensor" implementation according to various embodiments of the invention.

In one embodiment, in a "pitch rate sensor" implementation, the secondary motion is such that proof masses 402-408 move in the same direction along secondary axis 103 that is normal to the plane of the substrate, as shown in FIG. 10, i.e., the gyroscope is sensitive to rotation about rate axis 102 that is an in-plane axis orthogonal to primary axis 101. In either case, each of the proof masses moves in-phase with the diametrically opposite one and in anti-phase with respect to the remaining two masses. In other words, at any given instant, the velocity of mass 402 has the same orientation of velocity as mass 408, while the velocity of mass 404 and mass 406 has the opposite orientation.

FIG. 11A and FIG. 11B illustrate structures that comprise a secondary rotary joint system 1100, 1120 that constrains a secondary motion of proof masses in a yaw rate sensor according to various embodiments of the invention. In a manner similar to FIG. 8, joints are formed by fixed mechanical hinges 814 coupled to flexible components, such as flexible mechanical hinges 820, a rigid body (arm 830), and an anchor point fixed to a base frame that is not shown in FIG. 11A- 11B. In operation, system 1100, 1120 permits a primary motion in the driving direction as well as secondary motion along the secondary axis, while practically suppressing all spurious motions along the secondary axis, such that only the Coriolis force is effective. One of ordinary skill in the art will appreciate that any other configuration of masses, joints, etc., and additional anchoring, frames, decoupling structures, etc., is possible to achieve the principles in accordance with the present invention.

In one embodiment, in order to achieve a complete mechanical rejection, displacement of masses 402-408 along rate axis 103 is inhibited by one of primary joints, secondary joints, a combination of primary and secondary joints, or by additional mechanical constraints. In one embodiment, several mechanical components act as both primary and secondary joint. It is understood that the primary and secondary joint systems be independent from each other.

Figure 11C:
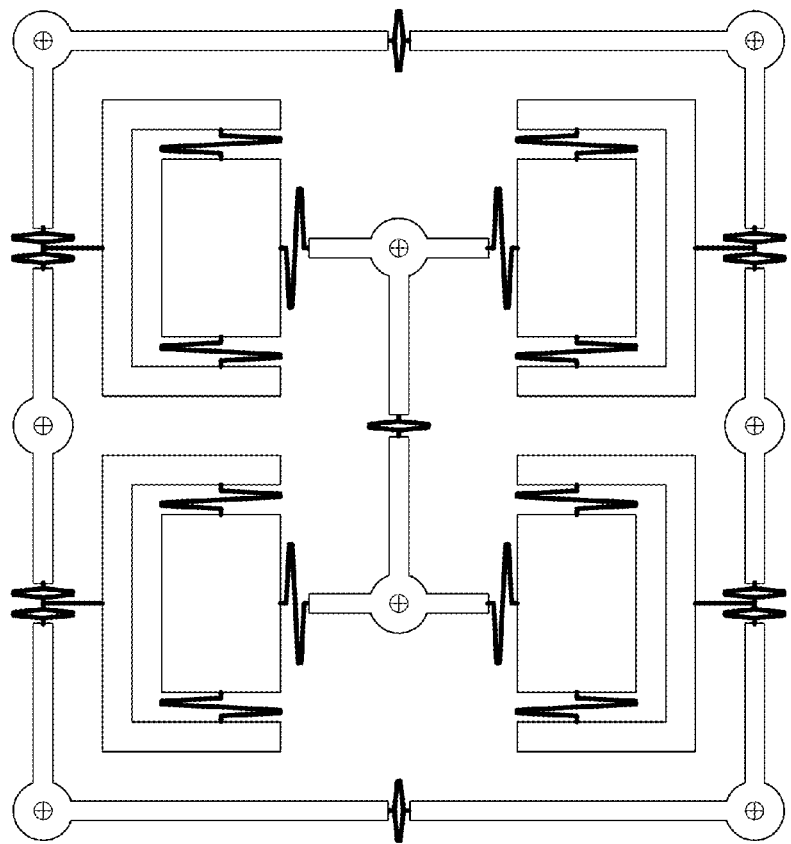
FIG. 11C illustrates an exemplary out-of-plane gyroscope comprising primary and secondary joint systems according to various embodiments of the invention.
Figure 11D:
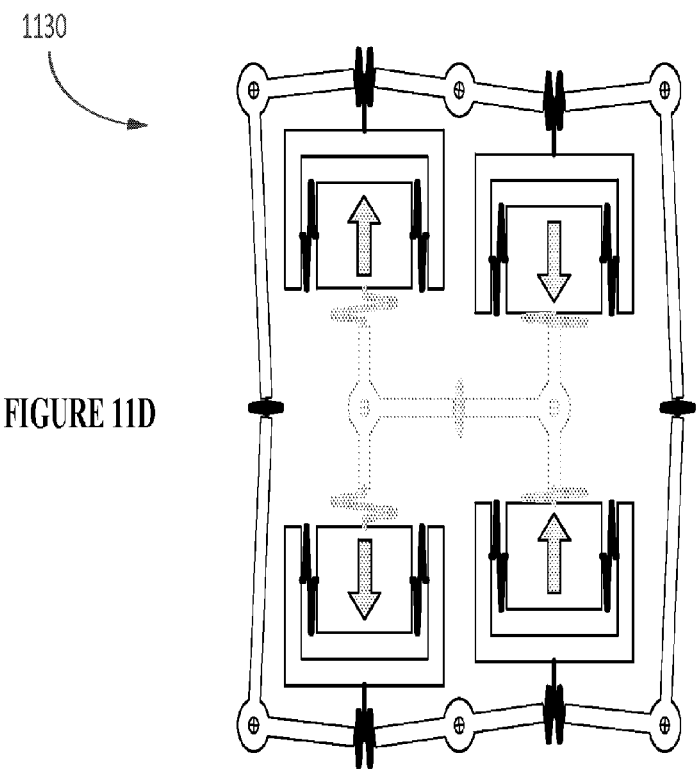
FIG. 11D illustrates the primary joint system of FIG. 8B implemented into the out-of-plane gyroscope shown in FIG. 11C.
Figure 11E:
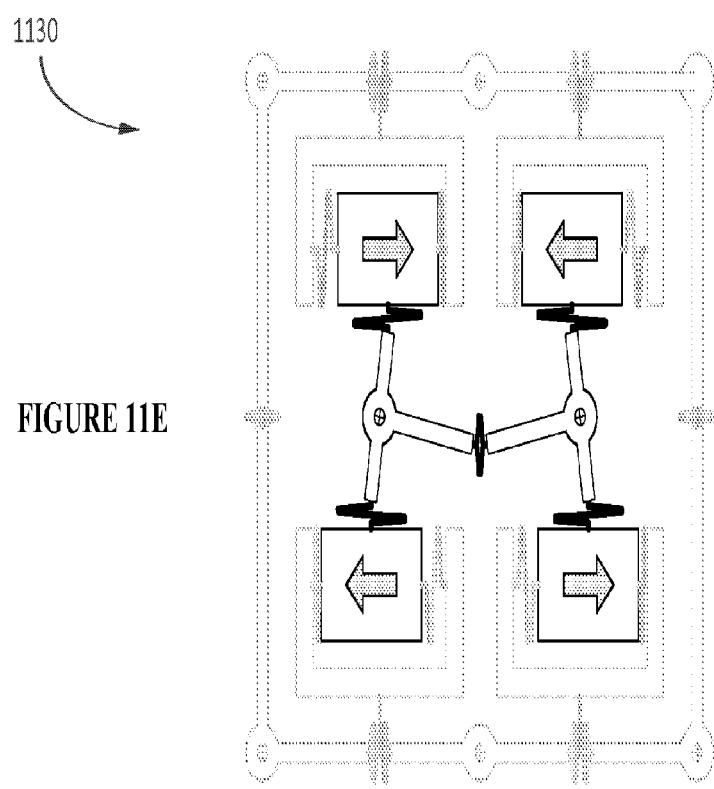
FIG. 11E illustrates the secondary joint system of FIG. 11B implemented into the out-of-plane gyroscope shown in FIG. 11C.
Figure 11F:
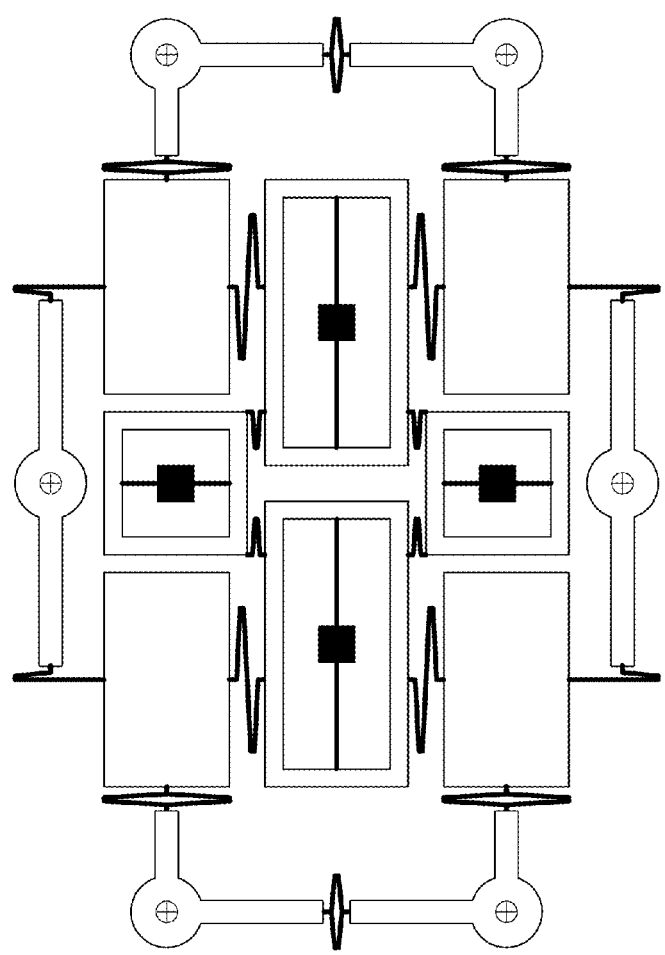
FIG. 11F illustrates an exemplary in-plane gyroscope comprising primary and secondary joint systems according to various embodiments of the invention.
Figure 11G:
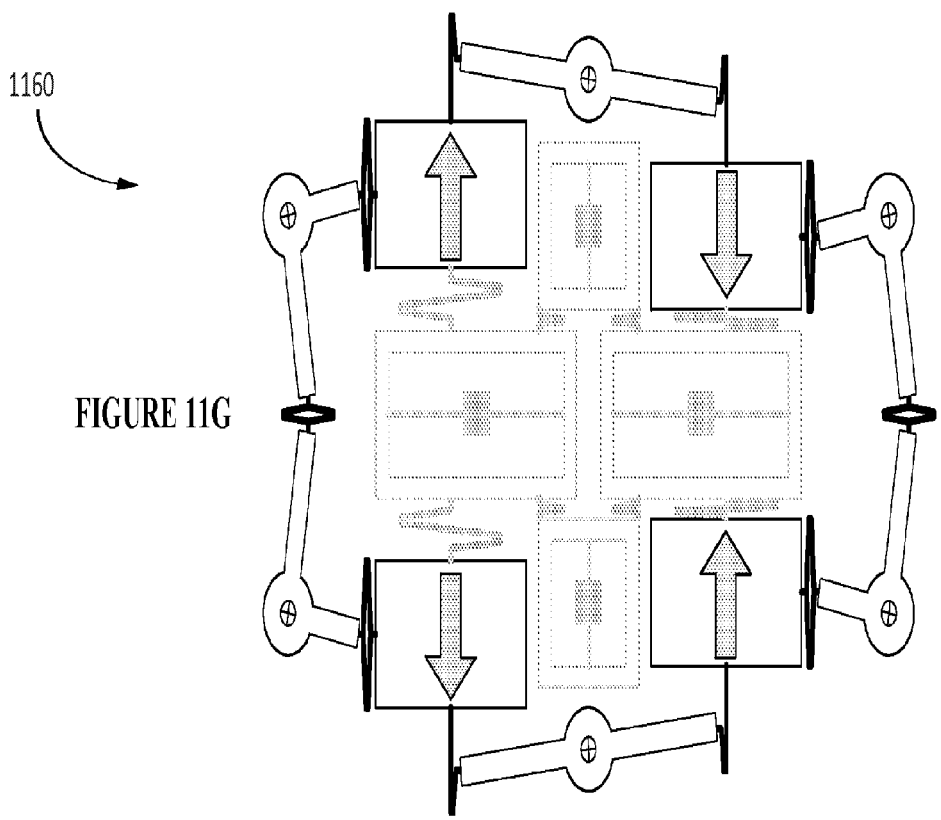
FIG. 11G illustrates the primary joint system of FIG. 8A implemented into the in-plane gyroscope shown in FIG. 11F.
Figure 11H:
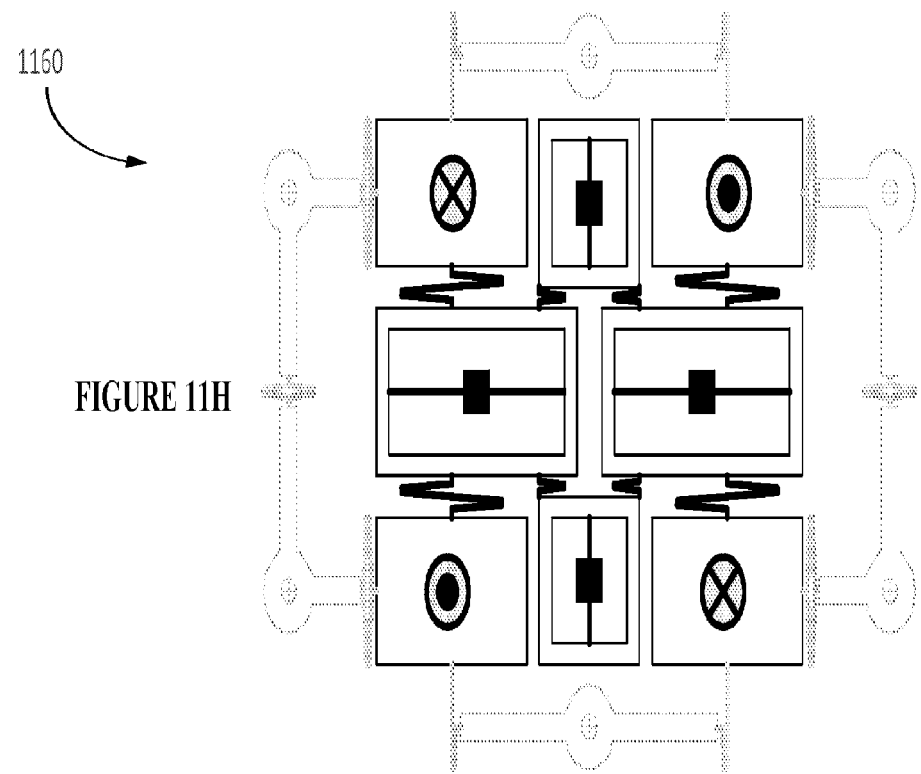
FIG. 11H illustrates the secondary joint system of FIG. 12B implemented into the in-plane gyroscope shown in FIG. 11F.

Examples of rotary joints that constrain the primary and the secondary motion while inhibiting the spurious motions, for a yaw rate sensor implementation as well as a pitch rate sensor implementation, are shown in FIG. 11C through FIG. 11H. FIG. 11C illustrates an exemplary yaw rate sensor 1130 comprising the primary joint system 850 of FIG. 8B and the secondary joint system 1120 of FIG. 11B. FIG. 11D illustrates the sensor 1130 of FIG. 11C during the primary motion, while FIG. 11E illustrates the same sensor 1130 during the secondary motion. Similarly, FIG. 11F illustrates an exemplary pitch rate sensor 1160 comprising the primary joint system 800 of FIG. 8A and the secondary joint system 1250 of FIG. 12B. FIG. 11G illustrates the sensor 1160 of FIG. 11F during the primary motion, while FIG. 11H illustrates the same sensor 1160 during the secondary motion.

Figure 12A:
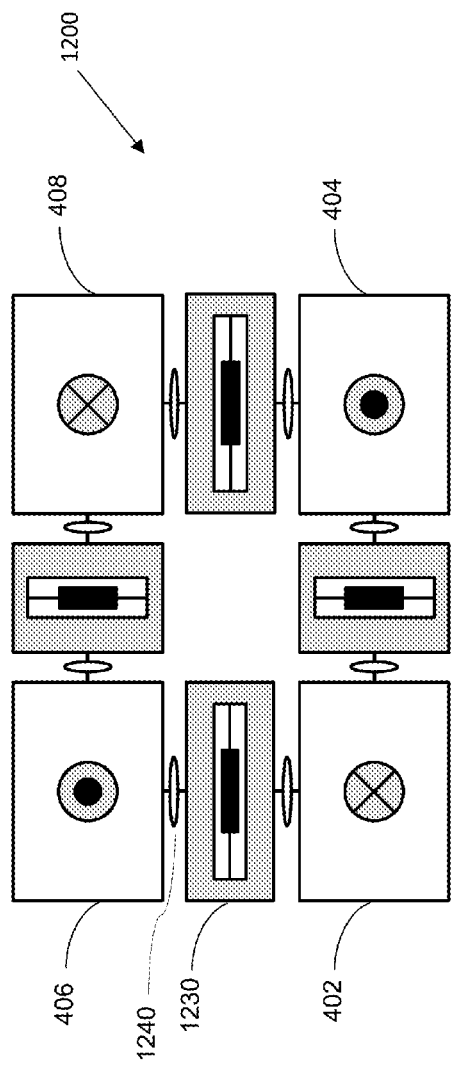
FIG. 12A and FIG. 12B illustrate examples of secondary joint systems in a pitch rate sensor according to various embodiments of the invention.
Figure 12B:
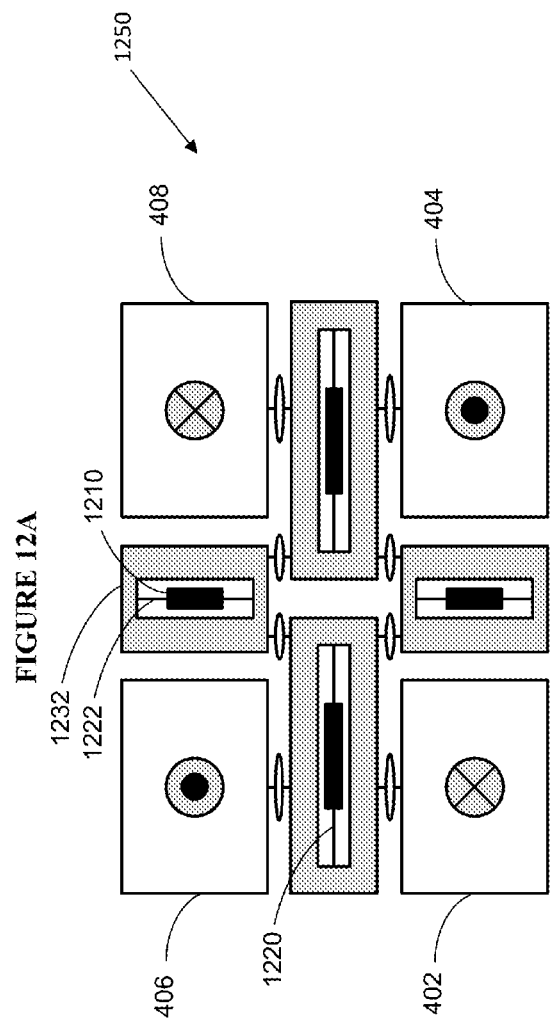

FIG. 12A and FIG. 12B illustrate structures that comprise a secondary rotary joint system to constrain a secondary motion of proof masses in a pitch rate sensor according to various embodiments of the invention. Devices 1200, 1250 comprise proof masses 402-408 that are connected to each other by joint systems comprising frames 1230, 1232, torsion springs 1220, 1222, and anchors 1210. Anchors 1210 are typically affixed to the substrate and connected to frames 1230, 1232 via torsion springs 1220, 1222. Torsion springs 1220, 1222 enable frames 1230, 1232, which are rotatably disposed between adjacent masses 402-408, to move about the primary and secondary axis, respectively, by pivoting around anchors 1210. Frames 1230, 1232 are suspended on anchors 1210 with torsion springs 1220, 1222 and connected to masses 402-408 via respective joints 1240.

In operation, in addition to oscillating motions at the same driving frequency, devices 1200, 1250 constrain the displacement of proof masses 402-408 in a sensing direction, i.e., normal to the plane of the substrate (not shown). Masses 402 and 408 are constrained to move, along this axis, in an opposite direction with respect to the movement of masses 404 and 406. Therefore, sensing motions due to Coriolis forces generated by an angular rate around the rate axis are enabled, while the motions caused by undesired mechanical disturbances are prevented from acting on masses 402-408 and interfering with electrical output signals. Restricting movements in this manner allows for rejection of spurious motions resulting from shock conditions. For example, if device 1200 is subjected to a parasitic load that would move masses 402, 406 with the same orientation towards their respective electrodes (not shown), frame 1230 will prevent this kind of displacement as not compliant with corresponding torsion spring 1220.

Figure 13:
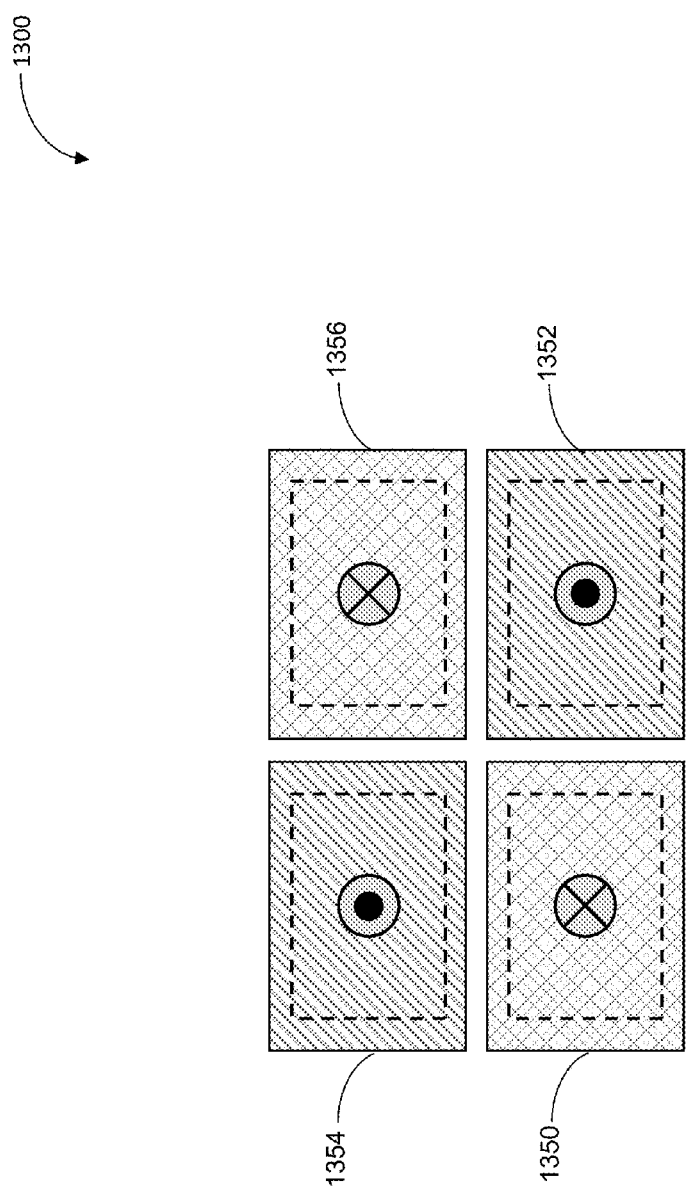
FIG. 13 illustrates an exemplary arrangement for the sensing electrodes in a pitch rate sensor implementation, according to various embodiments of the invention.

FIG. 13 illustrates an exemplary arrangement for the sensing electrodes in a pitch rate sensor implementation, according to various embodiments of the invention. The configuration of sensing electrodes 1350-1356 in system 1300 may vary depending on the particular implementation. In one embodiment, in order to achieve electrical rejection, sensing electrodes 1350-1356 are designed so as to facilitate detection of displacement of the four main masses (indicated by dashed lines) in the secondary direction. With respect to at least one of the symmetry axes of the main masses, system 1300 is connected in an anti-symmetrical configuration, such that electrodes 1350 and 1356 are electrically coupled to each other, and electrodes 1352 and 1354 are electrically coupled to each other. In this example, electrodes 1350-1356 are situated on a different plane with respect to the moving masses.

Figure 14:
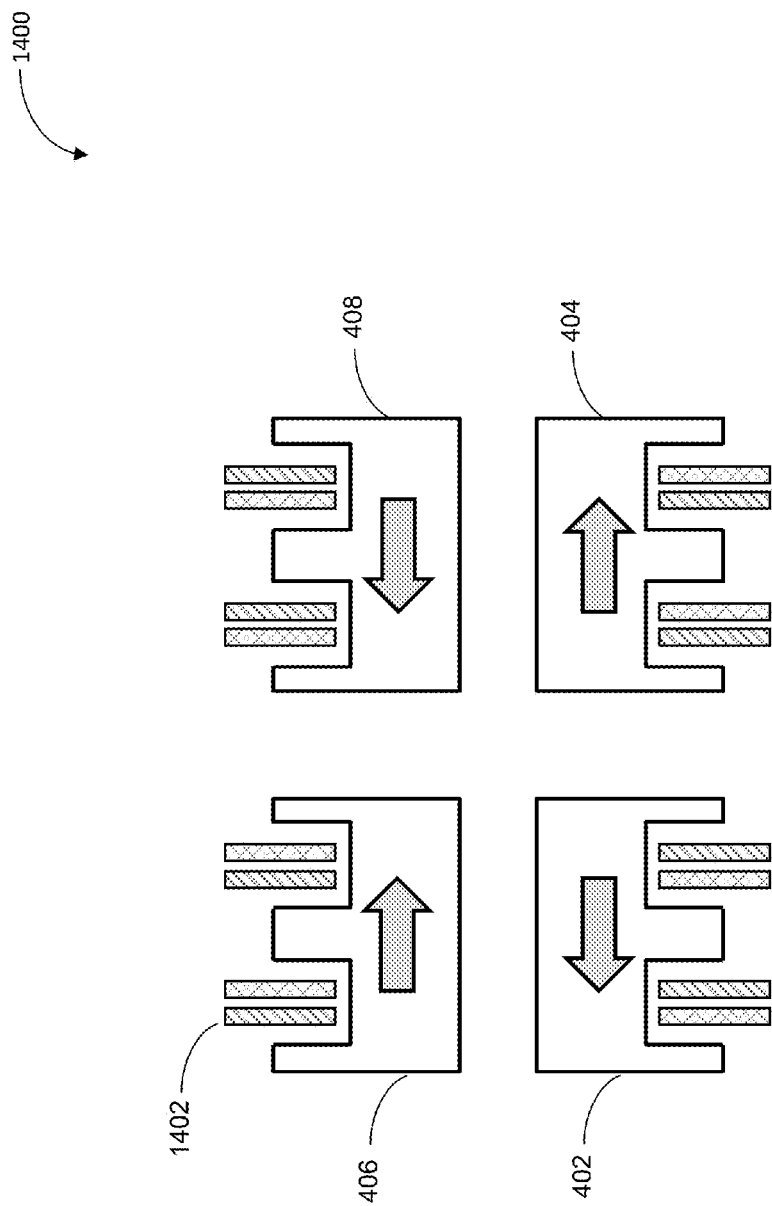
FIG. 14 illustrates an exemplary arrangement for the sensing electrodes for a yaw rate sensor implementation, according to various embodiments of the invention.

In example in FIG. 14, the "yaw rate sensor" implementation, electrodes 1402 are constructed as static structures that are built in to the same plane as moving masses 402-408. FIG. 14 shows an exemplary arrangement for sensing electrodes for a yaw rate sensor implementation. It is noted that, as with the embodiments discussed with respect to FIG. 4A through FIG. 5B, the concepts presented in FIG. 6 through FIG. 14 may be duplicated or triplicated, as needed, to create multi-axis sensors, such as gyroscopes, that are sensitive motion about all axes. In addition it is envisioned that any number and combination of masses may be utilized, for example, in order compensate for any imperfections in the manufacture of 402-408.

Figure 15:
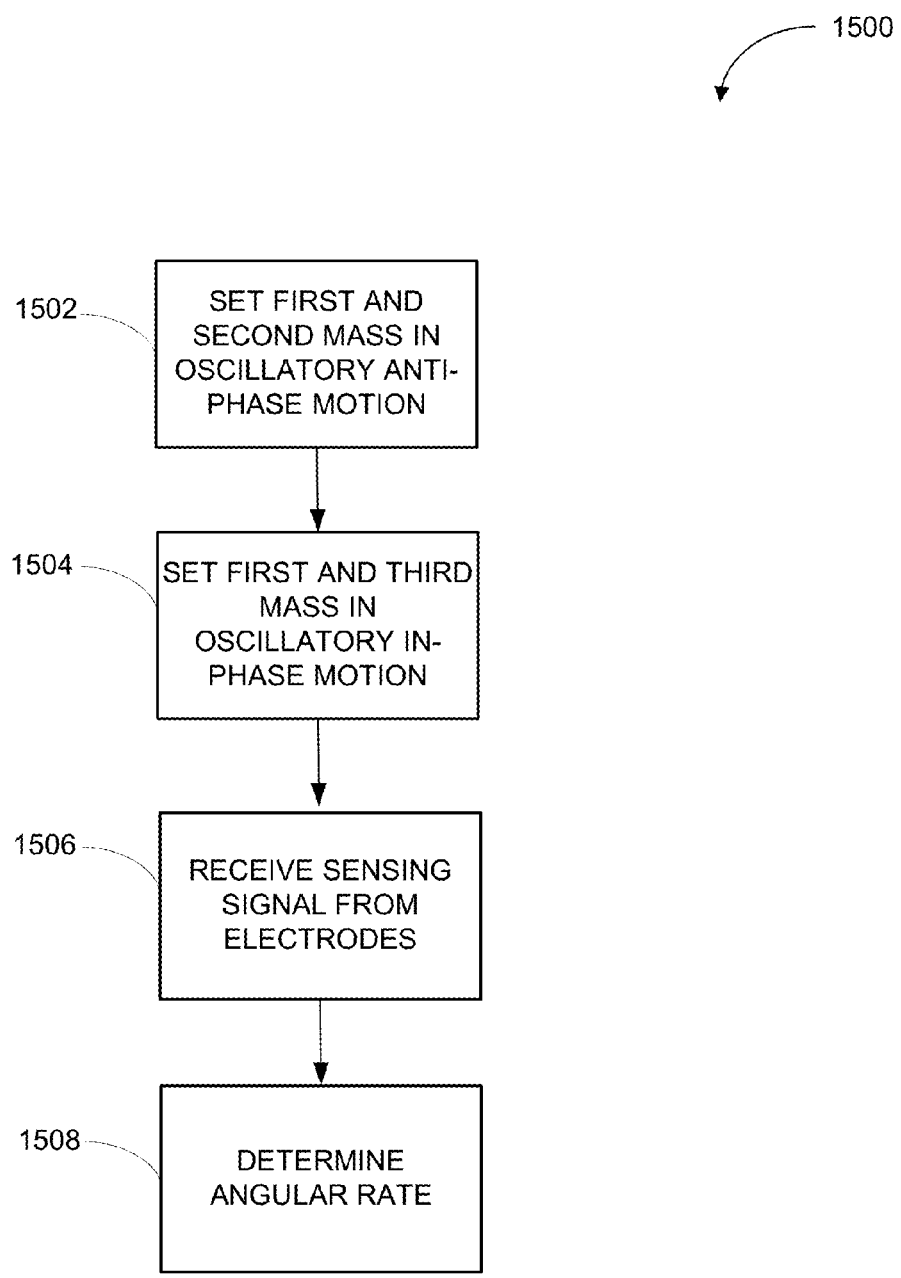
FIG. 15 is a flowchart of an illustrative process for facilitating shock robustness in rate sensors in accordance with various embodiments of the invention.

FIG. 15 is a flowchart of an illustrative process for facilitating shock robustness in rate sensors in accordance with various embodiments of the invention. In one embodiment, at step 1502, shock robustness is enabled by setting proof masses (e.g., adjacent proof masses) into an anti-phase oscillatory motion in a first plane, for example, along a gyroscope drive axis.

At step 1504, at least one of the proof masses is operated in-phase in an oscillatory motion with another (e.g., diametrically opposing) proof mass located in a plane parallel to the drive axis, such that the two masses move in-phase and at the same rate. Together with the anti-phase movement of the adjacent proof masses, this suppresses a common mode motion between masses located in planes orthogonal to the drive axis.

At step 1506, a measured sensing signal is received from a plurality of sensing electrodes.

Finally, at step 1508, an angular rate is determined in a sensing direction, without interference from deflection of elements caused by shock movements impacting the gyroscope, which otherwise would erroneously indicate a rotational acceleration.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A shock robust rotational rate sensor comprising:
   first and second masses disposed symmetrically with respect to a first symmetry axis;
   third and fourth masses disposed symmetrically with respect to the first symmetry axis, the first through fourth masses are arranged to oscillate in a primary motion, wherein the first mass oscillates in-phase with the fourth mass and anti-phase with both the second mass and the third mass;
   a first set of electrodes that detects displacements of the first and fourth masses in a direction of a secondary motion, at least two electrodes of the first set of electrodes being coupled to each other to generate a first output signal;
   a second set of electrodes configured to detect displacements of the second and third masses in the direction of the secondary motion, at least two electrodes of the second set of electrodes being coupled to each other to generate a second output signal, wherein a differential electrical signal representative of a Coriolis force is obtainable in response to the first and second electric output signals; and
   a joint system coupled to the first through fourth masses, the joint system substantially limiting movements of the first through fourth masses to the primary motion and the secondary motion, the secondary motion being orthogonal to the primary motion.

2. The sensor according to claim 1, wherein the first and third masses are disposed symmetrically with respect to a second symmetry axis that is orthogonal to the first symmetry axis, such that the first and fourth masses diametrically oppose each other.

3. The sensor according to claim 1, wherein the first mass oscillates anti-phase with at least two adjacent masses.

4. The sensor according to claim 1, wherein the first symmetry axis is one of at least a driving axis and a sense axis.

5. The sensor according to claim 1, wherein the sensor is a multi-axis gyroscope configured to sense a rate about at least two sensing axes.

6. The sensor according to claim 1, wherein the joint system comprises a plurality of mechanical joints that interconnect the first through fourth masses.

7. The sensor according to claim 1, wherein the joint system is substantially symmetric with respect to the first and second symmetry axes.

8. The sensor according to claim 1, further comprising a frame that is suspended with a torsion spring and rotatably disposed between adjacent masses, the frame is configured to pivot around an axis of the torsion spring to permit the adjacent masses to move in opposite directions.

9. The sensor according to claim 1, further comprising a rotary joint disposed on a plane common with the first through fourth masses, the rotary joint is suspended with bending beam springs that are configured to rotate around a fixed center that is located in the plane.

10. The sensor according to claim 1, wherein the first and second set of electrodes are situated on different planes than the first through fourth masses.

11. A shock robust rotational rate sensor comprising:
first and second masses disposed symmetrically with respect to a first symmetry axis;
third and fourth masses arranged disposed symmetrically with respect to the first symmetry axis, the first through fourth masses are arranged to oscillate in a primary motion, wherein the first mass oscillates in-phase with the fourth mass and anti-phase with the second mass and the third mass;
a joint system coupled to the first through fourth masses, the joint system comprising a plurality of mechanical joints that interconnect the first through fourth masses to substantially limit movements of the first through fourth masses to the primary motion and to a secondary motion that is orthogonal to the primary motion; and
a first and a second set of electrodes, wherein the electrodes of the first set are configured to detect displacements of the first and fourth masses in a direction of secondary motion, and the electrodes of the second set are configured to detect displacements of the second and third masses in the direction of secondary motion, and wherein the electrodes of the first set are coupled to each other to generate a first output signal, and the electrodes of the second set are coupled to each other to generate a second output signal, such that a differential electrical signal representative of a Coriolis force is obtainable by processing the first and second electric output signals.

12. A method to facilitate shock robustness in rate sensors, the method comprising:
oscillating a first and second mass in a first direction;
oscillating a third and fourth mass in the first direction;
oscillating the first mass in-phase with the fourth mass;
oscillating the first mass anti-phase with the second mass and the third mass;
applying a joint system to the first through fourth masses to substantially prevent movements other than a primary motion in the first direction and a secondary motion in a second direction that is orthogonal to the first direction;
receiving a first sensing signal from a first pair of sensing electrodes associated with displacements of the first and fourth masses;
generating a first output signal from the first sensing signal;
receiving a second sensing signal from a second pair of sensing electrodes associated with displacements of the second and third masses;
generating a second output signal from the second sensing signal; and
in response to the first and second output signals, generating an electrical signal that is representative of a Coriolis force.

13. The method according to claim 12, wherein the first through fourth masses oscillate with substantially the same amplitude.

14. The method according to claim 12, wherein the velocity of the first mass has the same orientation as that of the fourth mass and has the opposite orientation of the velocity of the second and third masses.

15. The method according to claim 12, wherein the joint system comprises a plurality of mechanical joints configured to couple the first through fourth masses to each other.

16. The method according to claim 12, further comprising determining an angular rate in a sensing direction.

* * * * *